US012389409B2

(12) United States Patent
Zhang et al.

(10) Patent No.: US 12,389,409 B2
(45) Date of Patent: Aug. 12, 2025

(54) DYNAMIC INDICATION OF A FULL DUPLEX RANDOM ACCESS CHANNEL OCCASION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 17/645,590

(22) Filed: Dec. 22, 2021

(65) Prior Publication Data

US 2023/0199853 A1 Jun. 22, 2023

(51) Int. Cl.
*H04W 74/0833* (2024.01)
*H04L 5/14* (2006.01)
*H04W 72/23* (2023.01)
*H04W 74/00* (2009.01)

(52) U.S. Cl.
CPC ........... *H04W 74/0833* (2013.01); *H04L 5/14* (2013.01); *H04W 72/23* (2023.01); *H04W 74/006* (2013.01)

(58) Field of Classification Search
CPC ...... H04L 5/14; H04W 72/23; H04W 74/006; H04W 74/0833; H04W 74/0836
See application file for complete search history.

(56) References Cited

U.S. PATENT DOCUMENTS

| 11,596,004 | B2* | 2/2023 | Zhang | H04W 72/1273 |
| 2020/0305157 | A1* | 9/2020 | Kim | H04W 74/0833 |
| 2021/0058219 | A1* | 2/2021 | Kimura | H04L 5/14 |
| 2021/0100029 | A1 | 4/2021 | Lei et al. | |
| 2021/0282042 | A1* | 9/2021 | Park | H04W 24/10 |
| 2021/0337582 | A1* | 10/2021 | Kuang | H04W 72/044 |
| 2021/0352697 | A1* | 11/2021 | Irukulapati | H04B 7/0695 |
| 2022/0217736 | A1* | 7/2022 | Taherzadeh Boroujeni | H04L 5/0094 |
| 2022/0312504 | A1* | 9/2022 | Zhang | H04W 74/0858 |
| 2022/0322156 | A1* | 10/2022 | Kim | H04W 76/28 |
| 2022/0330182 | A1* | 10/2022 | Kim | H04W 56/001 |

(Continued)

FOREIGN PATENT DOCUMENTS

| EP | 4002947 A1 | 5/2022 | |
| EP | 4243517 A1 * | 9/2023 | ........... H04B 7/0408 |

(Continued)

OTHER PUBLICATIONS

International Search Report and Written Opinion—PCT/US2022/079918—ISA/EPO—Feb. 15, 2023.

*Primary Examiner* — Shah M Rahman
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a configuration of a resource associated with a random access channel (RACH) message. The UE may receive an indication of whether the resource associated with the RACH message is permitted to be used for transmission of the RACH message, wherein the indication is included in a dynamic signaling communication. The UE may transmit the RACH message in accordance with the indication. Numerous other aspects are described.

30 Claims, 9 Drawing Sheets

(56) References Cited

U.S. PATENT DOCUMENTS

| | | | |
|---|---|---|---|
| 2023/0054111 A1* | 2/2023 | Rudolf | H04W 74/006 |
| 2023/0062577 A1* | 3/2023 | Rudolf | H04W 74/0833 |
| 2023/0101801 A1* | 3/2023 | Cozzo | H04L 5/14 |
| | | | 370/277 |
| 2023/0163937 A1* | 5/2023 | Awadin | H04L 5/14 |
| | | | 370/329 |
| 2024/0188074 A1* | 6/2024 | Lohr | H04W 72/1268 |

FOREIGN PATENT DOCUMENTS

| | | | | |
|---|---|---|---|---|
| WO | WO-2020222458 A1 | 11/2020 | | |
| WO | WO-2021066441 A1 | 4/2021 | | |
| WO | WO-2022122997 A1 * | 6/2022 | | H04B 17/24 |
| WO | WO-2023281722 A1 * | 1/2023 | | |
| WO | WO-2023030654 A1 * | 3/2023 | | H04W 74/02 |

* cited by examiner

DYNAMIC INDICATION OF A FULL DUPLEX RANDOM ACCESS CHANNEL OCCASION

FIELD OF THE DISCLOSURE

Aspects of the present disclosure generally relate to wireless communication and to techniques and apparatuses for dynamic indication of a full duplex random access channel (RACH) occasion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving a configuration of a resource associated with a random access channel (RACH) message. The method may include receiving an indication of whether the resource associated with the RACH message is permitted to be used for transmission of the RACH message, wherein the indication is included in a dynamic signaling communication. The method may include transmitting the RACH message in accordance with the indication.

Some aspects described herein relate to a method of wireless communication performed by a base station. The method may include transmitting, to a UE, a configuration of a resource associated with a RACH message. The method may include transmitting, to the UE, an indication of whether the resource associated with the RACH message is permitted to be used for transmission of the RACH message, wherein the indication is included in a dynamic signaling communication. The method may include receiving, from the UE, the RACH message in accordance with the indication.

Some aspects described herein relate to an apparatus for wireless communication at a UE. The UE may include a memory and one or more processors coupled to the memory. The one or more processors may be configured to receive a configuration of a resource associated with a RACH message. The one or more processors may be configured to receive an indication of whether the resource associated with the RACH message is permitted to be used for transmission of the RACH message, wherein the indication is included in a dynamic signaling communication. The one or more processors may be configured to transmit the RACH message in accordance with the indication.

Some aspects described herein relate to an apparatus for wireless communication at a base station. The base station may include a memory and one or more processors coupled to the memory. The one or more processors may be configured to transmit, to a UE, a configuration of a resource associated with a RACH message. The one or more processors may be configured to transmit, to the UE, an indication of whether the resource associated with the RACH message is permitted to be used for transmission of the RACH message, wherein the indication is included in a dynamic signaling communication. The one or more processors may be configured to receive, from the UE, the RACH message in accordance with the indication.

Some aspects described herein relate to a non-transitory computer-readable medium that stores a set of instructions for wireless communication by a UE. The set of instructions, when executed by one or more processors of the UE, may cause the UE to receive a configuration of a resource associated with a RACH message. The set of instructions, when executed by one or more processors of the UE, may cause the UE to receive an indication of whether the resource associated with the RACH message is permitted to be used for transmission of the RACH message, wherein the indication is included in a dynamic signaling communication. The set of instructions, when executed by one or more processors of the UE, may cause the UE to transmit the RACH message in accordance with the indication.

Some aspects described herein relate to a non-transitory computer-readable medium that stores a set of instructions for wireless communication by a base station. The set of instructions, when executed by one or more processors of the base station, may cause the base station to transmit, to a UE, a configuration of a resource associated with a RACH message. The set of instructions, when executed by one or more processors of the base station, may cause the base station to transmit, to the UE, an indication of whether the resource associated with the RACH message is permitted to be used for transmission of the RACH message, wherein the indication is included in a dynamic signaling communication. The set of instructions, when executed by one or more processors of the base station, may cause the base station to receive, from the UE, the RACH message in accordance with the indication.

Some aspects described herein relate to an apparatus for wireless communication. The apparatus may include means for receiving a configuration of a resource associated with a RACH message. The apparatus may include means for receiving an indication of whether the resource associated with the RACH message is permitted to be used for transmission of the RACH message, wherein the indication is included in a dynamic signaling communication. The apparatus may include means for transmitting the RACH message in accordance with the indication.

Some aspects described herein relate to an apparatus for wireless communication. The apparatus may include means for transmitting, to a UE, a configuration of a resource associated with a RACH message. The apparatus may include means for transmitting, to the UE, an indication of whether the resource associated with the RACH message is permitted to be used for transmission of the RACH message, wherein the indication is included in a dynamic signaling communication. The apparatus may include means for receiving, from the UE, the RACH message in accordance with the indication.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
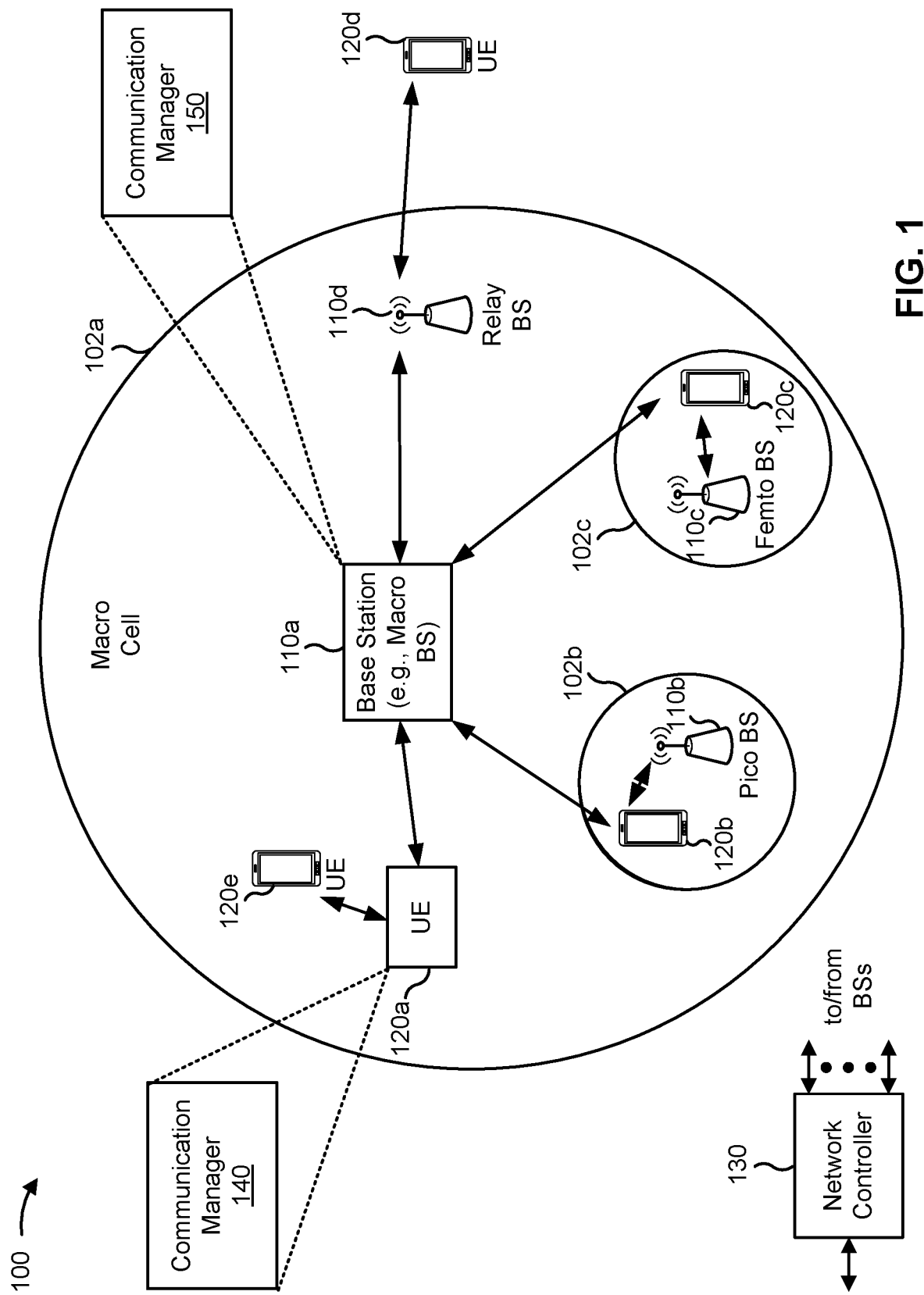
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a resource associated with a RACH message; receive an indication of whether the resource associated with the RACH message is permitted to be used for transmission of the RACH message, wherein the indication is included in a dynamic signaling communication; and transmit the RACH message in accordance with the indication. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration of a resource associated with a RACH message; transmit, to the UE, an indication of whether the resource associated with the RACH message is permitted to be used for transmission of the RACH message, wherein the indication is included in a dynamic signaling communication; and receive, from the UE, the RACH message in accordance with the indication. Additionally, or alternatively, the communication manager 150 may perform one or more other operations described herein.

As indicated above, FIG. 1 is provided as an example. Other examples may differ from what is described with regard to FIG. 1.

Figure 2:
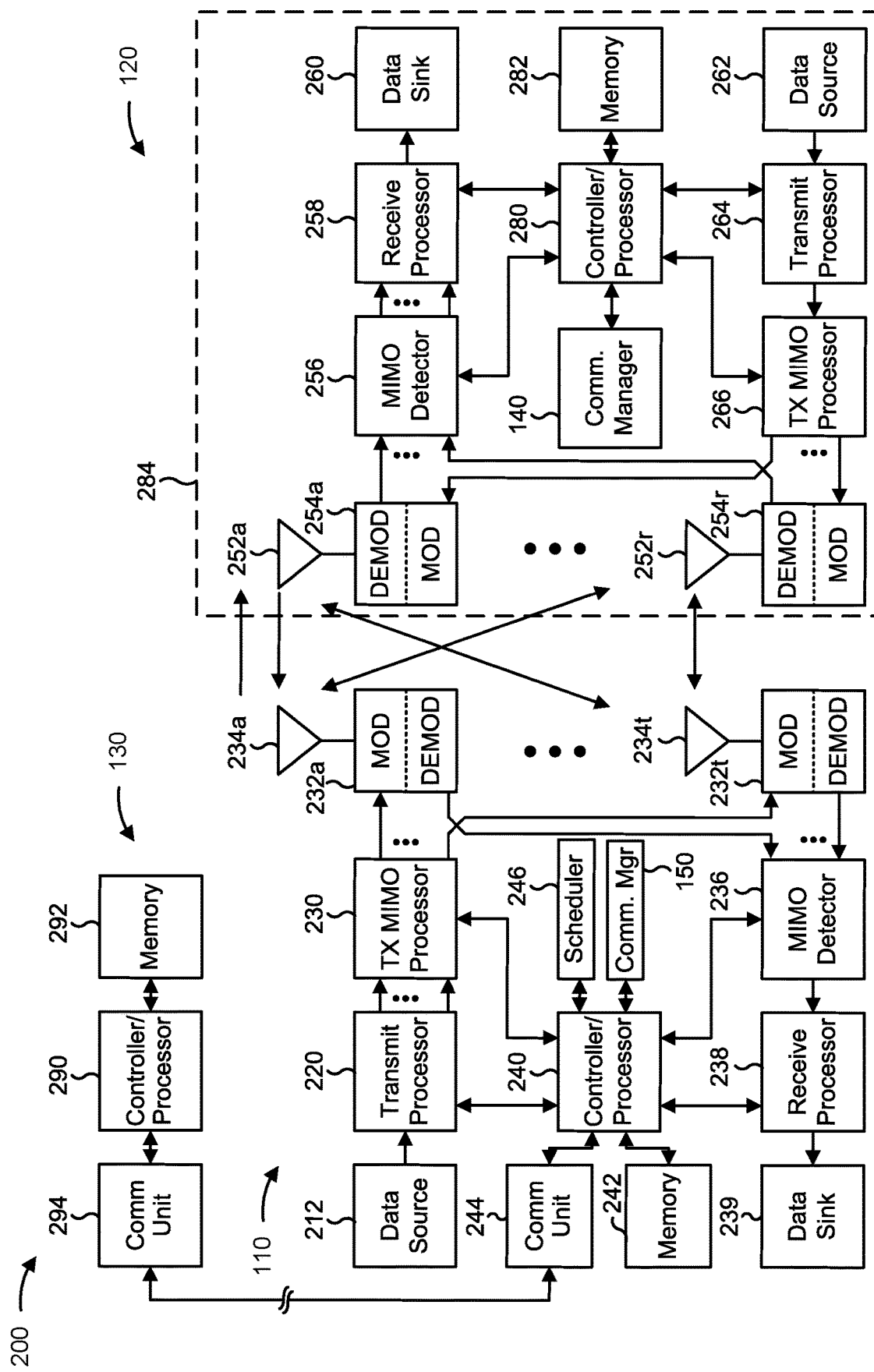
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with dynamic indication of a full duplex RACH occasion, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving a configuration of a resource associated with a RACH message (e.g., using antenna 252, modem 254, MIMO detector 256, receive processor 258, controller/processor 280, memory 282, or the like); means for receiving an indication of whether the resource associated with the RACH message is permitted to be used for transmission of the RACH message (e.g., using antenna 252, modem 254, MIMO detector 256, receive processor 258, controller/processor 280, memory 282, or the like), wherein the indication is included in a dynamic signaling communication; and/or means for transmitting the RACH message in accordance with the indication (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a configuration of a resource associated with a RACH message (e.g., using controller/processor 240, transmit processor 220, TX MIMO processor 230, modem 232, antenna 234, memory 242, or the like); means for transmitting, to the UE, an indication of whether the resource associated with the RACH message is permitted to be used for transmission of the RACH message (e.g., using controller/processor 240, transmit processor 220, TX MIMO processor 230, modem 232, antenna 234, memory 242, or the like), wherein the indication is included in a dynamic signaling communication; and/or means for receiving, from the UE, the RACH message in accordance with the indication (e.g., using antenna 234, modem 232, MIMO detector 236, receive processor 238, controller/processor 240, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
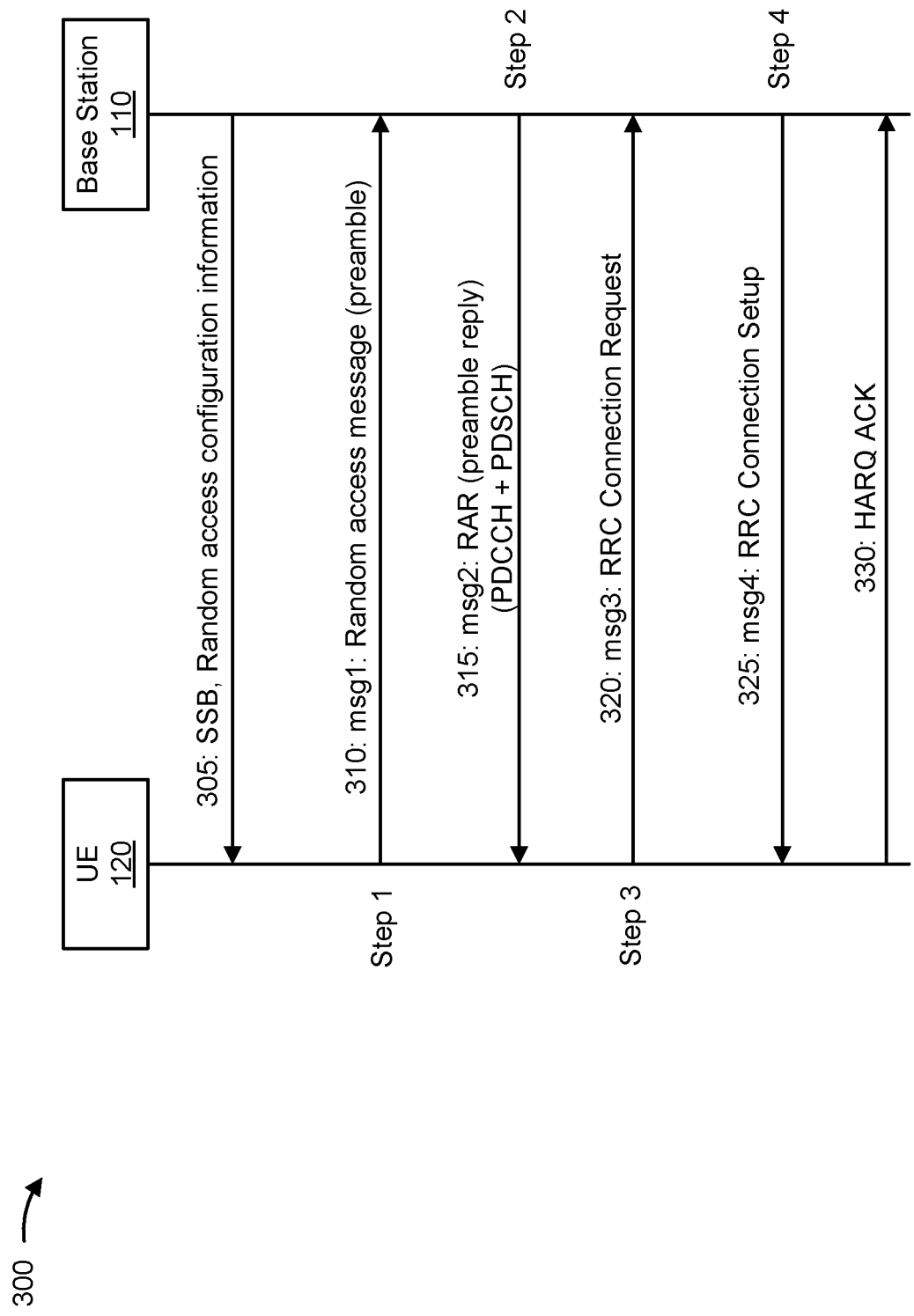
FIG. 3 is a diagram illustrating an example of a four-step random access procedure, in accordance with the present disclosure.

FIG. 3 is a diagram illustrating an example 300 of a four-step random access procedure, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 310, the UE 120 may transmit a RAM, which may include a preamble (sometimes referred to as a random access preamble, a physical random access channel (PRACH) preamble, or a RAM preamble). The message that includes the preamble may be referred to as a message 1, msg1, MSG1, a first message, or an initial message in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) packet data unit (PDU) of the PDSCH communication.

As shown by reference number 320, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 330, if the UE 120 successfully receives the RRC connection setup message, the UE 120 may transmit a hybrid automatic repeat request acknowledgement (HARQ ACK) message.

Although the random access procedure described in connection with FIG. 3 is a four-step random access procedure, aspects of the disclosure are not so limited. In some other aspects, one or more of the steps described in connection with FIG. 3 (e.g., one or more of steps 1, 2, 3, and 4) may be combined such that the UE 120 and the base station 110 perform less than four steps during the random access procedure. For example, in some aspects, the UE 120 and the base station 110 may perform a two-step random access procedure. In such aspects, the UE 120 may initially transmit to the base station 110 a RAM preamble and a RAM payload as part of an initial (or first) step of the two-step random access procedure. In some aspects, the RAM may be referred to as message A, msgA, a first message, or an initial message in a two-step random access procedure. Moreover, the RAM may include some or all of the contents of message 1 (msg1) and message 3 (msg3) of the four-step random access procedure, indicated by reference numbers 310 and 320, respectively. If the base station 110 successfully receives and decodes the RAM preamble, the base station 110 may then receive and decode the RAM payload. The base station 110 may then transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of the four-step random access procedure described above in connection with reference numbers 315 and 325, respectively. More or fewer steps may be employed for the random access procedure without departing from the scope of the disclosure.

As indicated above, FIG. 3 is provided as an example. Other examples may differ from what is described with regard to FIG. 3.

Figure 4B:
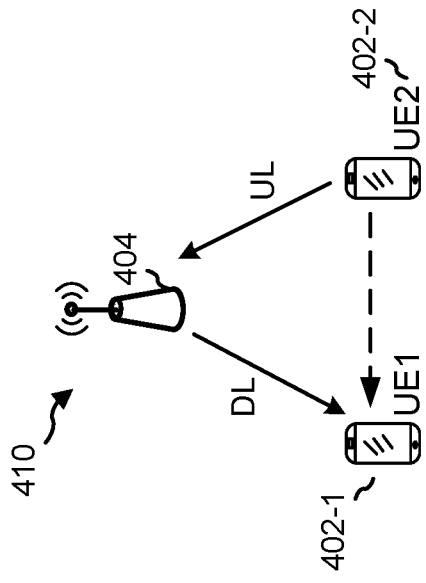
FIGS. 4A-4C are diagrams illustrating examples of full duplex communication in accordance with the present disclosure.
Figure 4C:
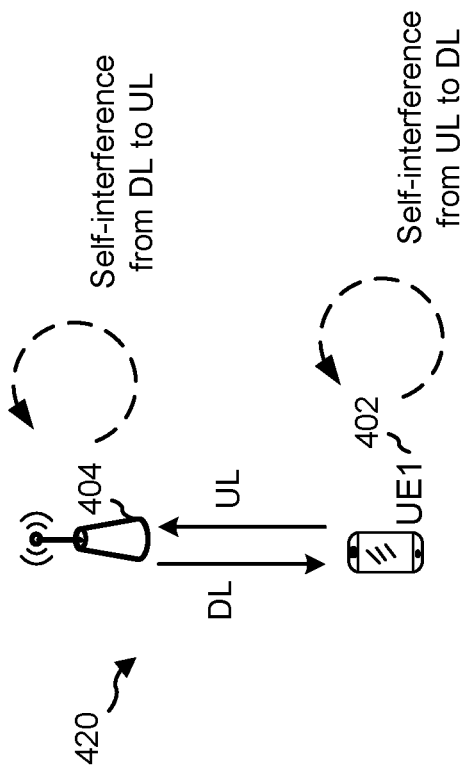
Figure 4A:
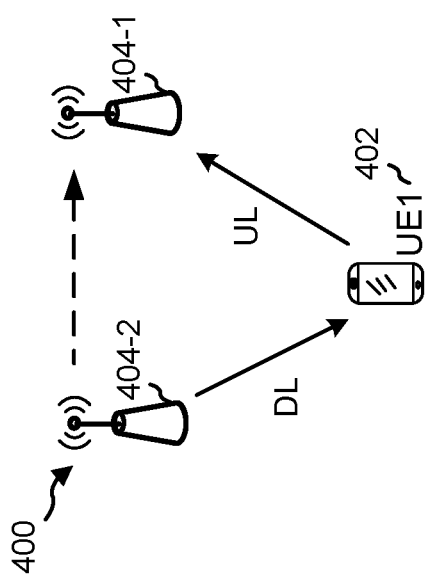

FIGS. 4A-4C are diagrams illustrating examples 400, 410, 420 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

The example 400 of FIG. 4A includes a UE1 402 and two base stations (e.g., TRPs) 404-1, 404-2, wherein the UE1 402 is sending uplink transmissions to base station 404-1 and is receiving downlink transmissions from base station 404-2. In the example 400 of FIG. 4A, FD is enabled for the UE1 402, but not for the base stations 404-1, 404-2. Thus, the base stations 404-1 and 404-2 are half duplex (HD) base stations.

The example 410 of FIG. 4B includes two UEs, UE1 402-1 and UE2 402-2, and a base station 404, wherein the UE1 402-1 is receiving a downlink transmission from the base station 404 and the UE2 402-2 is transmitting an uplink transmission to the base station 404. In the example 410 of FIG. 4B, FD is enabled for the base station 404, but not for the UE1 402-1 and UE2 402-2. Thus, the UE1 402-1 and UE2 402-2 are half duplex UEs.

The example 420 of FIG. 4C includes a UE1 402 and a base station 404, wherein the UE1 402 is receiving a downlink transmission from the base station 404 and the UE1 402 is transmitting an uplink transmission to the base station 404. In the example 420 of FIG. 4C, FD is enabled for both the UE1 402 and the base station 404. In the example 420 of FIG. 4C, the UE1 402 and the base station 404 communicate using a beam pair. A beam pair may include a downlink beam and an uplink beam. For example, a UE1 402 may use a beam pair that includes a downlink beam (that is, a receive beam) at the UE1 402 and an uplink beam (that is, a transmit beam) at the UE1 402 to communicate with the base station 404. The base station 404 may use a downlink beam (that is, a transmit beam) at the base station 404 to transmit communications received via the UE1 402's downlink beam, and may use an uplink beam (that is, a receive beam) at the base station 404 to receive communications transmitted via the UE1 402's uplink beam.

In FIGS. 4A-4C, interference is indicated by dashed lines. Interference can occur between nodes of examples 400, 410, 420 (referred to as "crosslink interference" (CLI)). Examples of CLI are shown in FIGS. 4A and 4B. In FIG. 4A, base station 404-2's downlink transmission interferes with base station 404-1's uplink transmission. In FIG. 4B, UE1 402-1's uplink transmission interferes with UE2 402-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a base station 404 (from a downlink transmission to an uplink reception) are shown in FIG. 4C. It should be noted that the above-described CLI and self-interference conditions can occur in HD deployments and in FD deployments.

When a base station 404 is operating in an FD mode by communicating with at least two UEs 402, with at least one UE 402 (e.g., UE 402-1) communicating via the downlink and at least one UE 402 (e.g., UE 402-2) communicating via the uplink (such as is shown in the example 410), the UE 402 receiving a downlink communication (e.g., UE 402-1) may experience CLI or other interference from the UE 402 transmitting a communication in the uplink (e.g., UE 402-1). For example, as described above in connection with FIG. 3, the UE 402-2 communicating in the uplink may transmit one or more of the RACH messages of the two- or four-step random access procedure, such as a communication associated with the messages indicated by reference number 310 and/or 320. In some aspects, the preconfigured time and frequency resources in which the UE 402-2 transmits a RACH message may be referred to as a RACH occasion (RO). One or more of the ROs may share (e.g., at least partially overlap) frequency resources and/or time resources with a downlink communication transmitted to the other UE 402-1, such as an SSB communication, a PDCCH communication, a PDSCH communication, or the like. For example, in FDM implementations, the one or more ROs may share time resources with the downlink communication associated with the UE 402-1, but the one or more ROs and the downlink communication may implement different frequency resources separated by a guard band. In SDM implementations, the one or more ROs may share both time resources and frequency resources with the downlink communication associated with the UE 402-1. In some aspects, the UE 402-2 may interfere with high-priority downlink communications when the UE 402-2 utilizes one or more ROs to transmit a RACH message (e.g., the UE 402 operating in the downlink (e.g., UE 402-1) suffers inter-UE CLI or similar interference from the UE 402 operating in the uplink (e.g., UE 402-2)). This may result in degraded service to UE 402-1, including increased latency as certain downlink transmissions may need to be resent by the base station 404, dropped calls or other interrupted communications, or link failure.

Some techniques and apparatuses described herein enable enhanced service to UEs 402 communicating with a base station 404 by dynamically scheduling one or more RACH messages so as to protect high priority downlink communications and similar transmissions that may otherwise be interfered with by the one or more RACH messages. More particularly, in some aspects, a base station 404 operating in an FD mode may provide a dynamic indication to one or more UEs 402 of whether one or more ROs are permitted to be used for transmission of a RACH message. The ROs permitted to be used for transmission of the RACH message may be ROs that do not overlap with a high priority downlink communication and/or may be ROs that overlap with a downlink communication when a CLI measurement from the one or more UEs 402 utilizing the ROs satisfies a certain threshold, thereby providing low risk of disruption to the downlink communication. The dynamic indication may be broadcasted to the one or more UEs 402, may be provided in a common DCI message sent to a group of UEs 402 or in a UE-specific DCI message, may be provided in a scheduled PDSCH or the like to one or more UEs 402 in a connected mode with the base station, or may be provided via another dynamic signaling message. Dynamically scheduling the one or more ROs for use by the one or more UEs 402 to avoid interference with high priority downlink communications in accordance with the present disclosure results in improved service to the one or more UEs 402, including decreased latency, reduced or eliminated dropped calls or other interrupted communications, and communication links that are protected from link failure or similar disruptions.

As indicated above, FIGS. 4A-4C are provided as one or more examples. Other examples may differ from what is described with regard to FIGS. 4A-4C.

Figure 5:
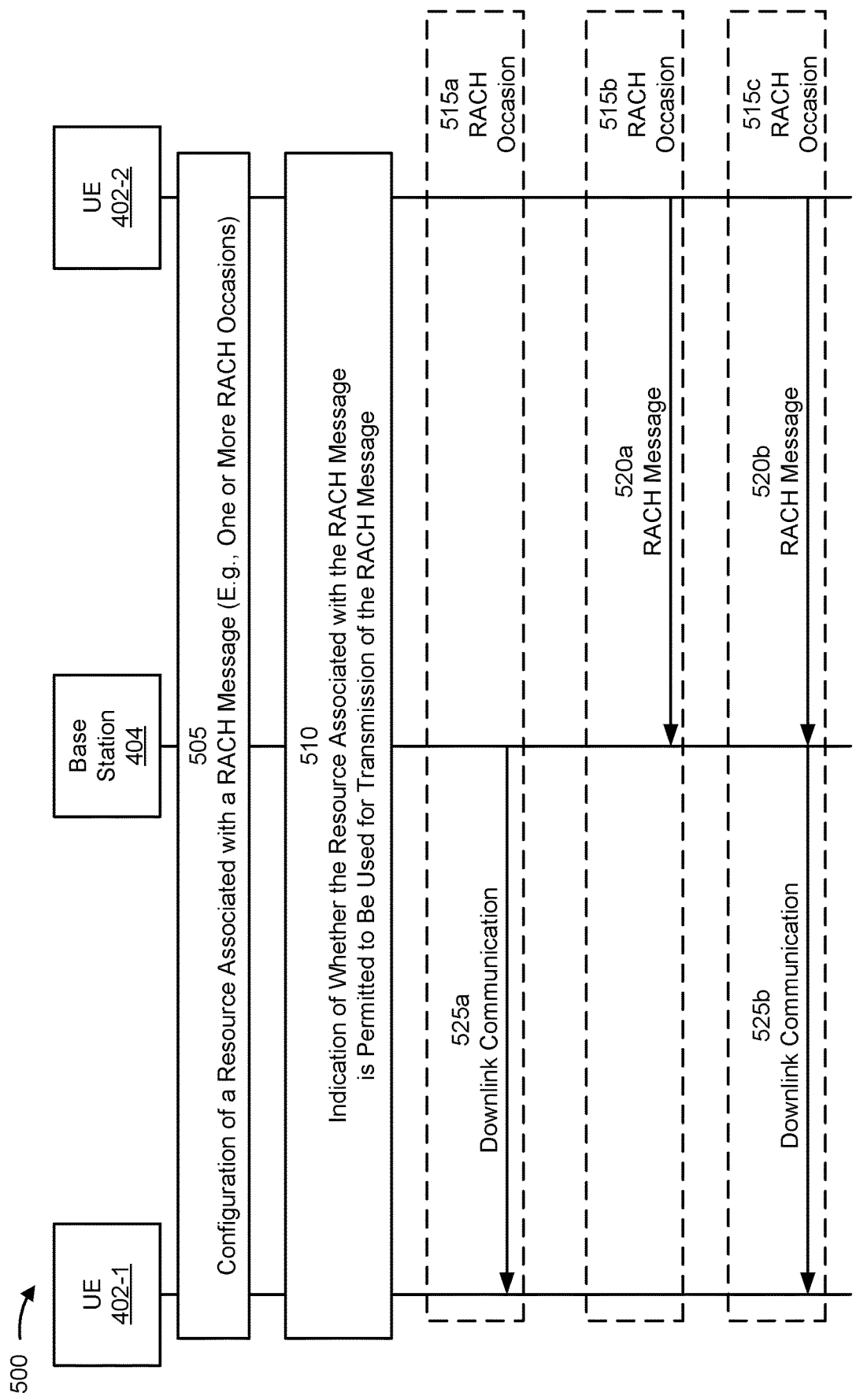
FIG. 5 is a diagram illustrating an example associated with dynamic indication of a full duplex RACH occasion, in accordance with the present disclosure.

FIG. 5 is a diagram illustrating an example 500 associated with dynamic indication of an FD RO, in accordance with the present disclosure. As shown in FIG. 5, a base station 404 may simultaneously communicate with a first UE 402-1 and a second UE 402-2 when operating in an FD mode.

As shown by reference number 505, the base station 404 may transmit a configuration of a resource associated with a RACH message to one or more UEs 402, such as the first UE 402-1 and the second UE 402-2. In some aspects, the resource associated with the RACH message may be a semi-statically scheduled frequency resource and/or time resource for performing RACH communications (e.g., the resource associated with the RACH message may be one or more ROs for use by the UEs 402). Although the first UE 402-1 and the second UE 402-2 are shown for purposes of the description, in some other aspects, more or fewer UEs 402 may be in communication with the base station 404 without departing from the scope of the disclosure. Moreover, and as will be described in more detail below, in some aspects, multiple UEs 402 (e.g., more than the second UE 402-2) may be permitted to transmit a RACH message in a particular RO.

As shown by reference number 510, the base station 110 may also transmit an indication of whether the resource associated with the RACH message (e.g., whether a particular RO) is permitted to be used for transmission of a RACH message by a UE 402. More particularly, the configuration indicated by reference number 505 may configure multiple ROs 515, such as, in the depicted example, a first RO 515a, a second RO 515b, and a third RO 515c, and the indication referenced by reference number 510 may indicate whether the UEs 402 are permitted to transmit a RACH message 520 in each corresponding RO 515. The three ROs 515 shown in FIG. 5 are provided merely for purposes of the description, and, in other aspects, the configuration indicated by reference number 505 may configure more or less ROs 515 without departing from the scope of the disclosure.

The indication referenced by reference number 510 may indicate that less than all of the ROs 515 may be used by one or more of the UEs 402 for transmission of a RACH message 520. For example, the base station 404 may be scheduled to transmit a downlink communication 525 to a first UE 402-1 in frequency resources and/or time resources that overlap with one or more of the ROs 515, and thus the indication referenced by reference number 510 may indicate that one or more of the UEs 402 are not permitted to transmit a RACH message 520 in that particular RO 515 in order to protect the downlink communication 525 from interference by the RACH message. More particularly, in the example shown, the base station 404 transmits a first downlink communication 525a to the first UE 402-1 in frequency resources and/or time resources that at least partially overlap with the first RO 515a. Thus, the indication may indicate to the second UE 402-2 that the first RO 515a is not permitted to be used for transmitting a RACH message 520 in order to avoid interference with the first downlink communication 525a by the RACH message 520. Accordingly, no RACH messages 520 are shown as being transmitted in the first RO 515a. However, the base station 404 is not scheduled to transmit a downlink communication 525 in frequency resources and/or time resources that overlap with the second RO 515b. Thus, the indication referenced by reference number 510 may indicate to the second UE 402-2 that the second RO 515b is permitted to be used for transmission of a RACH message 520. Accordingly, the second UE 402-2 may transmit a first RACH message 520a to the base station 404 in the second RO 515b.

In some aspects, the indication referenced by reference number 510 may indicate that the resource associated with the RACH message (e.g., one or more of the ROs 515) is permitted to be used for transmission of a RACH message 520 even when the base station 404 is scheduled to transmit a downlink communication 525 that at least partially overlaps with the RO 515. For example, as shown in FIG. 5, the first UE 402-1 is scheduled to receive a second downlink communication 525b in frequency resources and/or time resources that at least partially overlap with the third RO 515c. Nonetheless, the indication referenced by reference number 510 may indicate to the second UE 402-2 that the third RO 515c is permitted to be used for transmission of a RACH message 520. Accordingly, the second UE 402-2 may transmit a second RACH message 520b in the third RO 515c. In that regard, the frequency resources and/or time resources used to transmit the second RACH message 520b may at least partially overlap with the frequency resources and/or time resources used to transmit the second downlink communication 525b to the first UE 402-1, as described above in connection with FIG. 4B.

In some aspects, an RO 515 may be permitted to be used for a RACH message 520 notwithstanding that the RACH message 520 would at least partially overlap with a downlink communication 525 based at least in part on the type of downlink communication 525 scheduled in that particular RO 515. For example, the downlink communication 525 may be a low priority downlink communication, such as a communication not associated with a high priority task like control signaling, voice calls, videotelephony, or the like. In such instances, the RACH message 520 may take priority over the low priority downlink communication 525 and/or the risk of interference with the downlink communication 525 may be acceptable, and thus the indication referenced by reference number 510 indicates that the particular RO 515 is permitted to be used for transmission of a RACH message 520.

Additionally, or alternatively, an RO 515 may be permitted to be used for transmission of a RACH message 520, notwithstanding that the RACH message 520 would at least partially overlap with a downlink communication 525, based at least in part on the base station 404 determining that there is little risk of interference with the downlink communication 525 based at least in part on a CLI measurement or similar measurement. For example, when the second UE 402-2 is in a connected mode with the base station 404, the second UE 402-2 may transmit certain measurements or parameters to the base station 404, such as a CLI measurement associated with another UE 402 (e.g., the first UE 402-1). More particularly, the second UE 402-2 may measure the CLI associated with the first UE 402-1, and report that CLI measurement to the base station 404 in a RACH message 520 or otherwise. The base station 404 may then use the CLI measurement to dynamically schedule ROs 515 for use by the second UE 402-2 to send a RACH message 520. For example, if the CLI measurement does not satisfy a threshold (e.g., if the CLI is relatively high), the base station 404 may provide an indication to the second UE 402-2 (e.g., via the indication at reference number 510) indicating that the UE 402-2 is not permitted to use ROs 515 in which a downlink communication 525 is scheduled to be transmitted to the first UE 402-1, such as is shown regarding the first RO 515a in FIG. 5. However, if the CLI measurement satisfies the threshold (e.g., the CLI is relatively low), the base station 404 may provide an indication to the second UE 402-2 (e.g., via the indication at reference number 510) indicating that the second UE 402-2 is permitted to use ROs 515 in which a downlink communication 525 is scheduled to be transmitted to the first UE 402-1, such as is shown regarding the third RO 515c in FIG. 5.

In some aspects, the indication referenced by reference number 510 may indicate that a subset of UEs 402 is permitted to use certain ROs 515 for transmission of a corresponding RACH message 520. This may avoid certain ROs 515 including multiple RACH messages 520 from different UEs 402 that interfere with one another. In some aspects, the subset of UEs 402 permitted to use a certain RO may be determined based at least in part on a corresponding parameter associated with each UE 402 in the subset. For example, each UE 402 may be associated with a unique identification number, such as an international mobile equipment identity (IMEI), a temporary mobile subscriber identity (TMSI), a radio network temporary identifier (RNTI), or a similar identification number. In some aspects, the indication referenced by reference number 510 may indicate that only UEs 402 associated with certain identification numbers are permitted to use certain ROs 515. For example, the indication referenced by reference number 510 may indicate that only UEs 402 associated with even identification numbers are permitted to use one of the ROs 515, and that only UEs 402 associated with odd identification numbers are permitted to use a different one of the ROs 515. Additionally, or alternatively, the indication referenced by reference number 510 may indicate that only UEs 402 associated with a first range of identification numbers are permitted to use a first one of the ROs 515, that only UEs 402 associated with a second range of identification numbers are permitted to use a second one of the ROs 515, that only UEs 402 associated with a third range of identification numbers are permitted to use a third one of the ROs 515, and so forth. Returning to the example shown in FIG. 5, the indication referenced by reference number 510 may indicate that no UEs 402 are permitted to use the first RO 515a to transmit a corresponding RACH message 520 in order to protect the first downlink communication 525a. However, the indication referenced by reference number 510 may indicate that a first subset of UEs 402 (e.g., UEs 402 associated with an even identification number) are permitted to use the second RO 515b for transmission of a RACH message 520, and that a second subset of UEs 402 (e.g., UEs 402 associated with an odd identification number) are permitted to use the third RO 515c for transmission of a RACH message 520.

In some aspects, the indication referenced by reference number 510 is included in a dynamic signaling communication to one or more UEs 402, such that the indication of whether a resource associated with the RACH message 520 (e.g., an RO 515) is permitted to be used for transmission of a RACH message 520 may be dynamically scheduled in response to changing conditions such as increased or decreased downlink traffic, received CLI measurements, or the like. In some aspects, the dynamic signaling communication is included in a broadcast message. In such aspects, multiple UEs 402 may receive the indication whether or not each UE 402 is in a connected mode with the base station 404. For example, a UE 402 not yet in a connected mode with the base station 404 may receive the broadcast message and thus select a dynamically indicated RO 515 for sending an initial RACH message 520 of a random access procedure, such as one of the random access procedures described above in connection with FIG. 3.

In some other aspects, the dynamic signaling communication may be a DCI communication transmitted to one or more UEs 402. For example, the DCI communication may be a UE-specific DCI transmitted to a particular UE 402 (e.g., the second UE 402-2), or else may be a common DCI directed to a group of UEs 402. Returning to the example in which the base station 404 may dynamically schedule whether a particular RO 515 may be used based at least in part on a CLI parameter received from a particular UE 402, the DCI communication may be a UE-specific DCI communication provided only to that UE 402. Moreover, and returning to the example in which the base station 404 may dynamically schedule whether a particular RO 515 may be used based at least in part an identification number associated with a UE 402, the DCI communication may be directed to a subset of UEs 402, such as to all UEs 402 associated with an odd identification number, all UEs 402 associated with an even identification number, or the like.

In some other aspects, for a UE 402 in a connected mode with the base station 404, the dynamic signaling communication may be associated with a scheduled PDSCH communication or a similar communication. That is, the base station 404 may signal to a UE 402 whether an RO 515 is permitted to be used for transmission of a RACH message 520 using a preconfigured and/or scheduled PDSCH communication, similar to a paging process or the like.

As indicated above, FIG. 5 is provided as an example. Other examples may differ from what is described with respect to FIG. 5.

Figure 6:
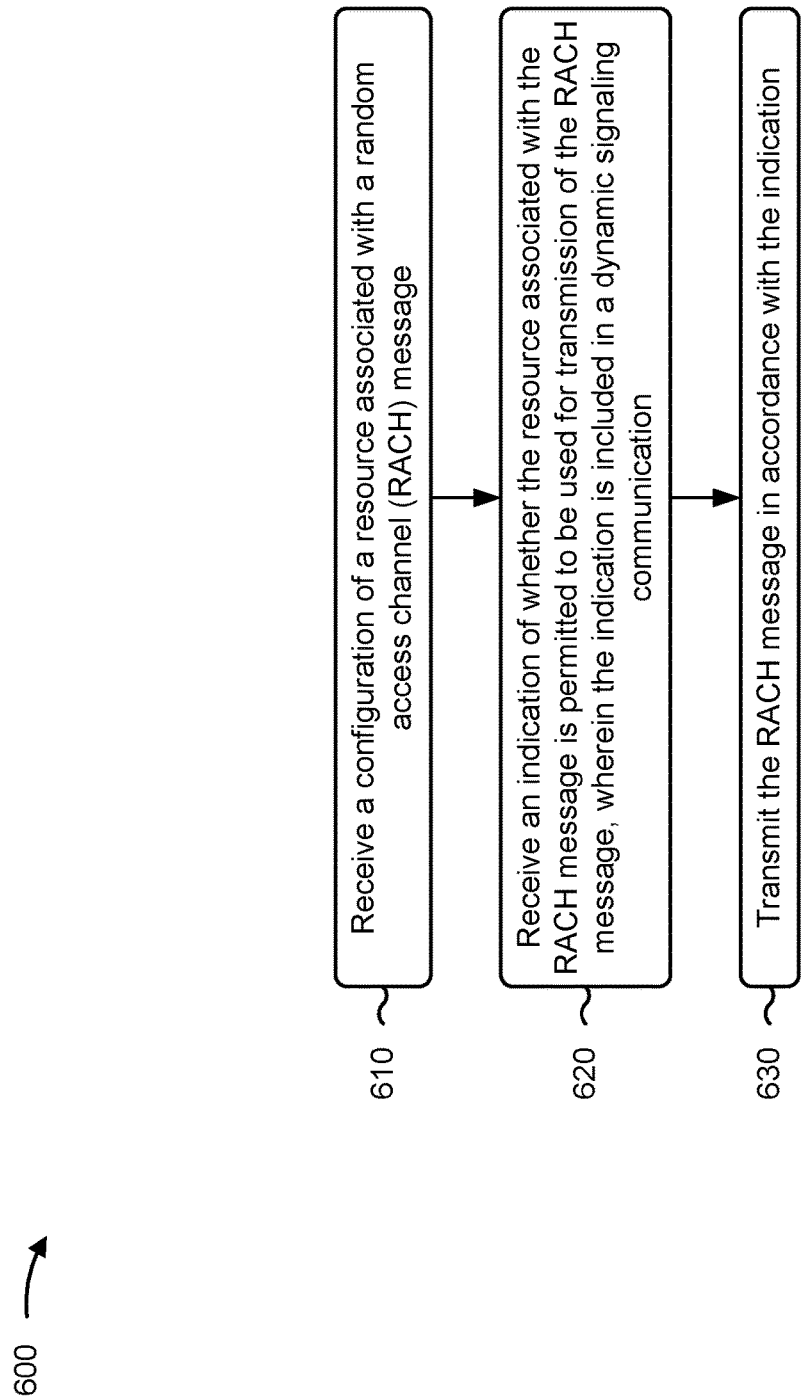
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with dynamic indication of an FD RO.

As shown in FIG. 6, in some aspects, process 600 may include receiving a configuration of a resource associated with a RACH message (block 610). For example, the UE (e.g., using communication manager 140 and/or reception component 802, depicted in FIG. 8) may receive a configuration of a resource associated with a RACH message, as described above.

As further shown in FIG. 6, in some aspects, process 600 may include receiving an indication of whether the resource associated with the RACH message is permitted to be used for transmission of the RACH message, wherein the indication is included in a dynamic signaling communication (block 620). For example, the UE (e.g., using communication manager 140 and/or reception component 802, depicted in FIG. 8) may receive an indication of whether the resource associated with the RACH message is permitted to be used for transmission of the RACH message, wherein the indication is included in a dynamic signaling communication, as described above.

As further shown in FIG. 6, in some aspects, process 600 may include transmitting the RACH message in accordance with the indication (block 630). For example, the UE (e.g., using communication manager 140 and/or transmission component 804, depicted in FIG. 8) may transmit the RACH message in accordance with the indication, as described above.

Process 600 may include additional aspects, such as any single aspect or any combination of aspects described below and/or in connection with one or more other processes described elsewhere herein.

In a first aspect, the indication is received from a base station operating in an FD mode.

In a second aspect, alone or in combination with the first aspect, the dynamic signaling communication is a broadcast message.

In a third aspect, alone or in combination with one or more of the first and second aspects, the dynamic signaling communication is a DCI communication.

In a fourth aspect, alone or in combination with one or more of the first through third aspects, the DCI communication is a common DCI communication directed to a group of UEs.

In a fifth aspect, alone or in combination with one or more of the first through fourth aspects, the dynamic signaling communication is a PDSCH communication.

Figure 8:
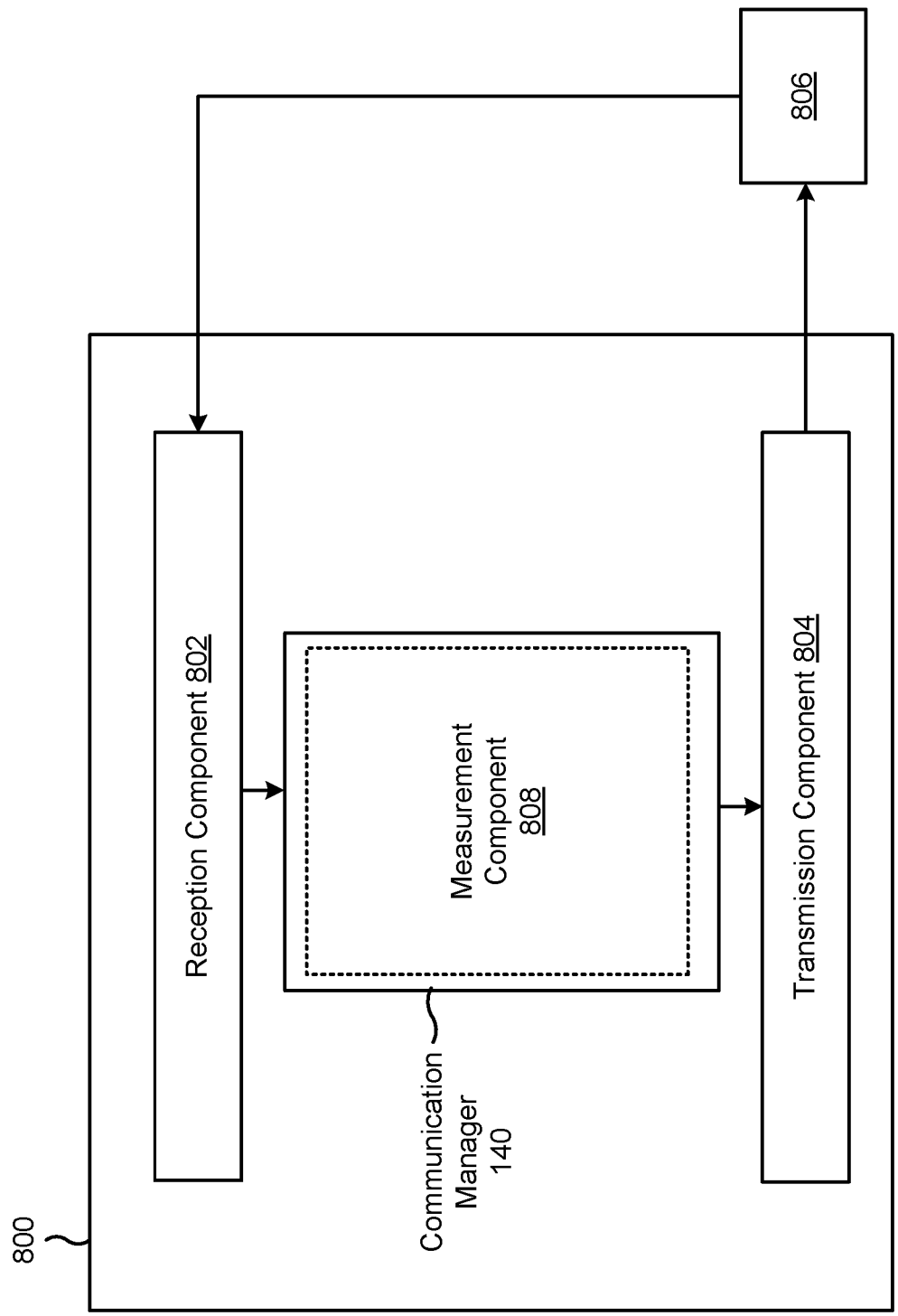
FIG. 8 is a diagram of an example apparatus for wireless communication, in accordance with the present disclosure.

In a sixth aspect, alone or in combination with one or more of the first through fifth aspects, the indication is based at least in part on a CLI measurement (which, in some aspects, may be measured using a measurement component 808, depicted in FIG. 8) associated with another UE.

In a seventh aspect, alone or in combination with one or more of the first through sixth aspects, the indication is received from a base station operating in an FD mode and, based at least in part on the CLI measurement satisfying a threshold, the resource is permitted to overlap with a downlink resource associated with the other UE.

In an eighth aspect, alone or in combination with one or more of the first through seventh aspects, the indication is received from a base station operating in an FD mode and, based at least in part on the CLI measurement not satisfying a threshold, the resource is not permitted to overlap with a downlink resource associated with the other UE.

In a ninth aspect, alone or in combination with one or more of the first through eighth aspects, process 600 includes receiving a configuration of another resource associated with the RACH message, wherein the indication indicates that the other resource associated with the RACH message is not permitted to be used for transmission of the RACH message based at least in part on the CLI measurement.

In a tenth aspect, alone or in combination with one or more of the first through ninth aspects, the indication is directed to a group of UEs.

In an eleventh aspect, alone or in combination with one or more of the first through tenth aspects, the indication indicates that a subset of UEs, of the group of UEs, is permitted to use the resource for RACH transmission.

In a twelfth aspect, alone or in combination with one or more of the first through eleventh aspects, each UE, of the group of UEs, is associated with a corresponding identification number, and the subset of UEs is based at least in part on the corresponding identification numbers of the subset of UEs.

In a thirteenth aspect, alone or in combination with one or more of the first through twelfth aspects, each UE, of the subset of UEs, is associated with a corresponding one of an odd identification number or an even identification number.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
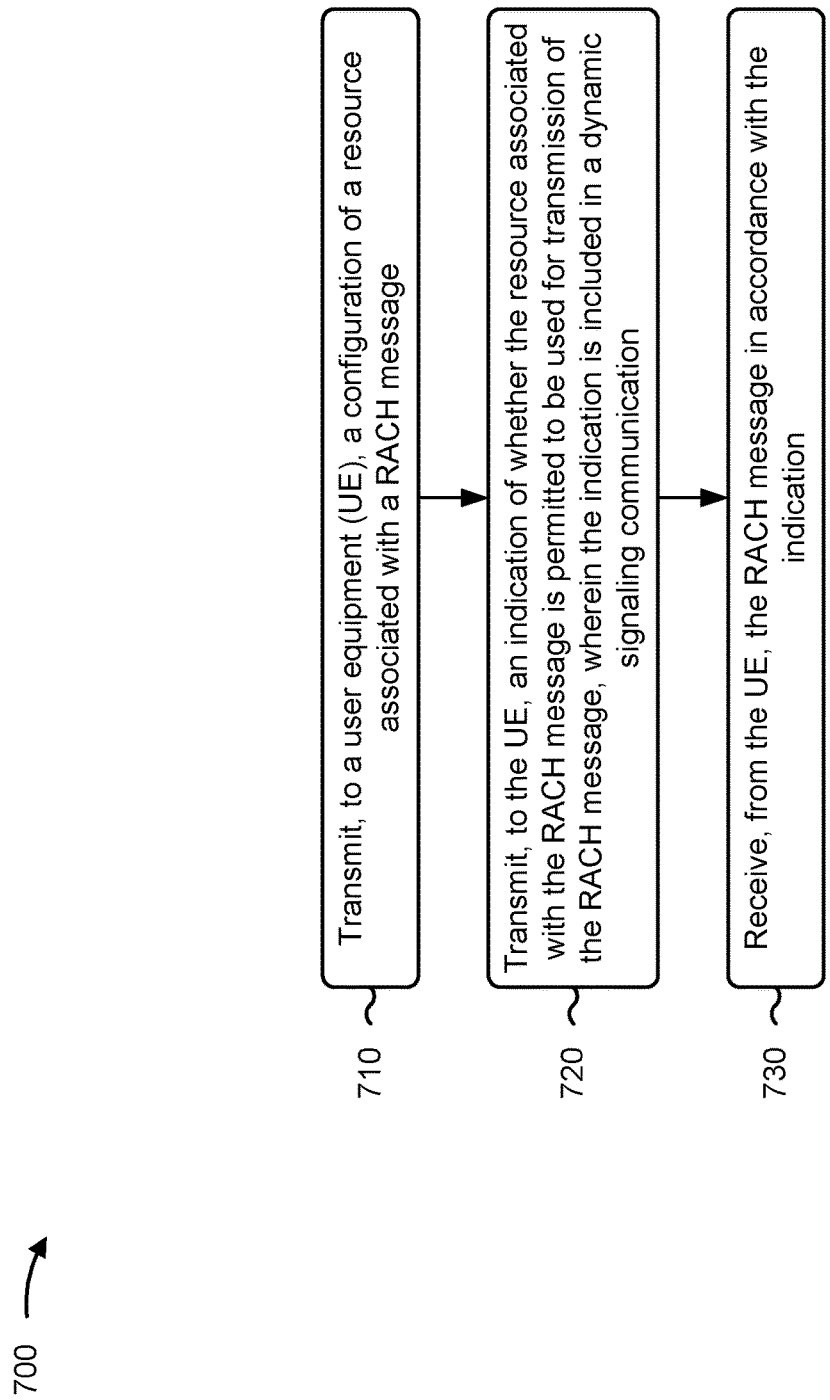
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with dynamic indication of an FD RO.

As shown in FIG. 7, in some aspects, process 700 may include transmitting, to a UE, a configuration of a resource associated with a RACH message (block 710). For example, the base station (e.g., using communication manager 150, transmission component 904, depicted in FIG. 9, and/or configuration component 908, depicted in FIG. 9) may transmit, to a UE, a configuration of a resource associated with a RACH message, as described above.

As further shown in FIG. 7, in some aspects, process 700 may include transmitting, to the UE, an indication of whether the resource associated with the RACH message is permitted to be used for transmission of the RACH message, wherein the indication is included in a dynamic signaling communication (block 720). For example, the base station (e.g., using communication manager 150, transmission component 904, depicted in FIG. 9, and/or scheduling component 910, depicted in FIG. 9) may transmit, to the UE, an indication of whether the resource associated with the RACH message is permitted to be used for transmission of the RACH message, wherein the indication is included in a dynamic signaling communication, as described above.

As further shown in FIG. 7, in some aspects, process 700 may include receiving, from the UE, the RACH message in accordance with the indication (block 730). For example, the base station (e.g., using communication manager 150 and/or reception component 902, depicted in FIG. 9) may receive, from the UE, the RACH message in accordance with the indication, as described above.

Process 700 may include additional aspects, such as any single aspect or any combination of aspects described below and/or in connection with one or more other processes described elsewhere herein.

In a first aspect, the base station is operating in an FD mode.

In a second aspect, alone or in combination with the first aspect, the dynamic signaling communication is a broadcast message.

In a third aspect, alone or in combination with one or more of the first and second aspects, the dynamic signaling communication is a DCI communication.

In a fourth aspect, alone or in combination with one or more of the first through third aspects, the DCI communication is a common DCI communication directed to a group of UEs.

In a fifth aspect, alone or in combination with one or more of the first through fourth aspects, the dynamic signaling communication is a PDSCH communication.

In a sixth aspect, alone or in combination with one or more of the first through fifth aspects, the indication is based at least in part on a CLI measurement associated with the UE and another UE.

In a seventh aspect, alone or in combination with one or more of the first through sixth aspects, the base station is operating in an FD mode and, based at least in part on the CLI measurement satisfying a threshold, the resource is permitted to overlap with a downlink resource associated with the other UE.

In an eighth aspect, alone or in combination with one or more of the first through seventh aspects, the base station is operating in an FD mode and, based at least in part on the CLI measurement not satisfying a threshold, the resource is not permitted to overlap with a downlink resource associated with the other UE.

In a ninth aspect, alone or in combination with one or more of the first through eighth aspects, process 700 includes transmitting a configuration of another resource associated with the RACH message, wherein the indication indicates that the other resource associated with the RACH message is not permitted to be used for transmission of the RACH message based at least in part on the CLI measurement.

In a tenth aspect, alone or in combination with one or more of the first through ninth aspects, the indication is directed to a group of UEs.

In an eleventh aspect, alone or in combination with one or more of the first through tenth aspects, the indication indicates that a subset of UEs, of the group of UEs, is permitted to use the resource for RACH transmission.

In a twelfth aspect, alone or in combination with one or more of the first through eleventh aspects, each UE, of the group of UEs, is associated with a corresponding identification number, and the subset of UEs is based at least in part on the corresponding identification numbers of the subset of UEs.

In a thirteenth aspect, alone or in combination with one or more of the first through twelfth aspects, each UE, of the subset of UEs, is associated with a corresponding one of an odd identification number or an even identification number.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a measurement component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration of a resource associated with a RACH message. The reception component 802 may receive an indication of whether the resource associated with the RACH message is permitted to be used for transmission of the RACH message, wherein the indication is included in a dynamic signaling communication. The transmission component 804 may transmit the RACH message in accordance with the indication. The reception component 802 may receive a configuration of another resource associated with the RACH message, wherein the indication indicates that the other resource associated with the RACH message is not permitted to be used for transmission of the RACH message based at least in part on the CLI measurement. The measurement component 808 may perform signal and/or interference measurements, such as CLI measurements or the like.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
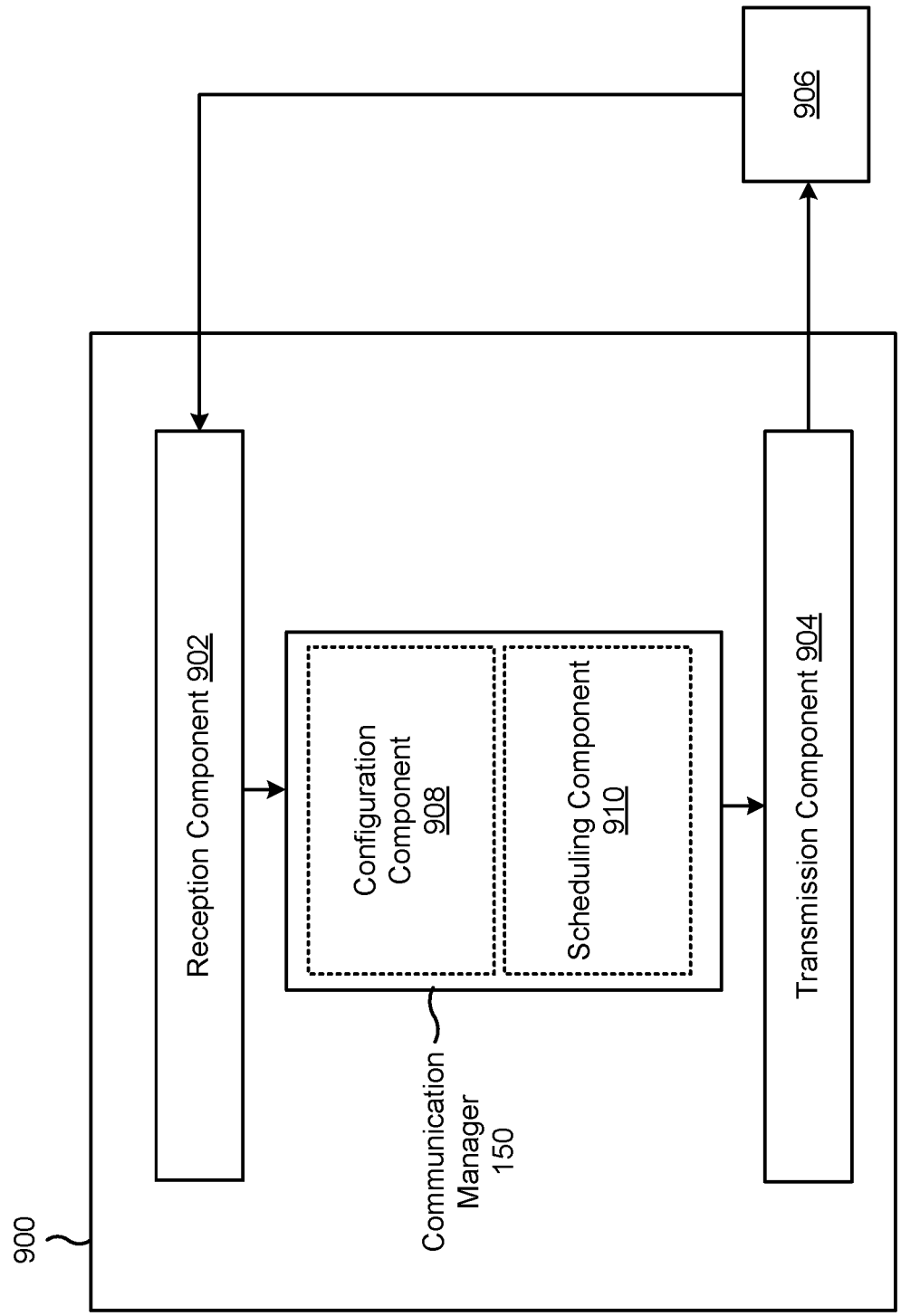
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a configuration component 908, or a scheduling component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 and/or the configuration component 908 may transmit, to a UE, a configuration of a resource associated with a RACH message. The transmission component 904 and/or the scheduling component 910 may transmit, to the UE, an indication of whether the resource associated with the RACH message is permitted to be used for transmission of the RACH message, wherein the indication is included in a dynamic signaling communication. The reception component 902 may receive, from the UE, the RACH message in accordance with the indication.

The transmission component 904 may transmit a configuration of another resource associated with the RACH message, wherein the indication indicates that the other resource associated with the RACH message is not permitted to be used for transmission of the RACH message based at least in part on the CLI measurement.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving a configuration of a resource associated with a RACH message; receiving an indication of whether the resource associated with the RACH message is permitted to be used for transmission of the RACH message, wherein the indication is included in a dynamic signaling communication; and transmitting the RACH message in accordance with the indication.

Aspect 2: The method of Aspect 1, wherein the indication is received from a base station operating in an FD mode.

Aspect 3: The method of any of Aspects 1-2, wherein the dynamic signaling communication is a broadcast message.

Aspect 4: The method of any of Aspects 1-3, wherein the dynamic signaling communication is a DCI communication.

Aspect 5: The method of Aspect 4, wherein the DCI communication is a common DCI communication directed to a group of UEs.

Aspect 6: The method of any of Aspects 1-5, wherein the dynamic signaling communication is a PDSCH communication.

Aspect 7: The method of any of Aspects 1-6, wherein the indication is based at least in part on a CLI measurement associated with another UE.

Aspect 8: The method of Aspect 7, wherein the indication is received from a base station operating in an FD mode, and wherein, based at least in part on the CLI measurement satisfying a threshold, the resource is permitted to overlap with a downlink resource associated with the other UE.

Aspect 9: The method of Aspect 7, wherein the indication is received from a base station operating in an FD mode, and wherein, based at least in part on the CLI measurement not satisfying a threshold, the resource is not permitted to overlap with a downlink resource associated with the other UE.

Aspect 10: The method of Aspect 7, further comprising receiving a configuration of another resource associated with the RACH message, wherein the indication indicates that the other resource associated with the RACH message is not permitted to be used for transmission of the RACH message based at least in part on the CLI measurement.

Aspect 11: The method of any of Aspects 1-10, wherein the indication is directed to a group of UEs.

Aspect 12: The method of Aspect 11, wherein the indication indicates that a subset of UEs, of the group of UEs, is permitted to use the resource for RACH transmission.

Aspect 13: The method of Aspect 12, wherein each UE, of the group of UEs, is associated with a corresponding identification number, and wherein the subset of UEs is based at least in part on the corresponding identification numbers of the subset of UEs.

Aspect 14: The method of Aspect 13, wherein each UE, of the subset of UEs, is associated with a corresponding one of an odd identification number or an even identification number.

Aspect 15: A method of wireless communication performed by a base station, comprising: transmitting, to a UE, a configuration of a resource associated with a RACH message; transmitting, to the UE, an indication of whether the resource associated with the RACH message is permitted to be used for transmission of the RACH message, wherein the indication is included in a dynamic signaling communication; and receiving, from the UE, the RACH message in accordance with the indication.

Aspect 16: The method of Aspect 15, wherein the base station is operating in an FD mode.

Aspect 17: The method of any of Aspects 15-16, wherein the dynamic signaling communication is a broadcast message.

Aspect 18: The method of any of Aspects 15-17, wherein the dynamic signaling communication is a DCI communication.

Aspect 19: The method of Aspect 18, wherein the DCI communication is a common DCI communication directed to a group of UEs.

Aspect 20: The method of any of Aspects 15-19, wherein the dynamic signaling communication is a PDSCH communication.

Aspect 21: The method of any of Aspects 15-20, wherein the indication is based at least in part on a CLI measurement associated with the UE and another UE.

Aspect 22: The method of Aspect 21, wherein the base station is operating in an FD mode, and wherein, based at least in part on the CLI measurement satisfying a threshold, the resource is permitted to overlap with a downlink resource associated with the other UE.

Aspect 23: The method of Aspect 21, wherein the base station is operating in an FD mode, and wherein, based at least in part on the CLI measurement not satisfying a threshold, the resource is not permitted to overlap with a downlink resource associated with the other UE.

Aspect 24: The method of Aspect 21, further comprising transmitting a configuration of another resource associated with the RACH message, wherein the indication indicates that the other resource associated with the RACH message is not permitted to be used for transmission of the RACH message based at least in part on the CLI measurement.

Aspect 25: The method of any of Aspects 15-24, wherein the indication is directed to a group of UEs.

Aspect 26: The method of Aspect 25, wherein the indication indicates that a subset of UEs, of the group of UEs, is permitted to use the resource for RACH transmission.

Aspect 27: The method of Aspect 26, wherein each UE, of the group of UEs, is associated with a corresponding identification number, and wherein the subset of UEs is based at least in part on the corresponding identification numbers of the subset of UEs.

Aspect 28: The method of Aspect 27, wherein each UE, of the subset of UEs, is associated with a corresponding one of an odd identification number or an even identification number.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   receive a configuration, in a first message, of multiple resources associated with a random access channel (RACH) message;
   receive an indication, in a second message comprising a downlink control information (DCI) communication or a physical downlink shared channel (PDSCH) transmission, based at least in part on a crosslink interference (CLI) measurement associated with another UE, of whether one or more resources, of the multiple resources, associated with the RACH message, are permitted to be used for transmission of the RACH message, wherein the indication is included in a dynamic signaling communication; and
   transmit the RACH message in accordance with the indication.

2. The apparatus of claim 1, wherein the indication is received from a base station operating in a full duplex (FD) mode.

3. The apparatus of claim 1, wherein the dynamic signaling communication is a broadcast message.

4. The apparatus of claim 1, wherein the DCI communication is a common DCI communication directed to a group of UEs.

5. The apparatus of claim 1, wherein the indication is received from a base station operating in a full duplex (FD) mode, and wherein, based at least in part on the CLI measurement satisfying a threshold, the one or more resources are permitted to overlap with a downlink resource associated with the other UE.

6. The apparatus of claim 1, wherein the indication is received from a base station operating in a full duplex (FD) mode, and wherein, based at least in part on the CLI measurement not satisfying a threshold, the one or more resources are not permitted to overlap with a downlink resource associated with the other UE.

7. The apparatus of claim 1, wherein the one or more processors are further configured to receive a configuration of another resource, of the one or more resources, associated with the RACH message, wherein the indication indicates that the other resource associated with the RACH message is not permitted to be used for transmission of the RACH message based at least in part on the CLI measurement.

8. The apparatus of claim 1, wherein the indication is directed to a group of UEs.

9. The apparatus of claim 8, wherein the indication indicates that a subset of UEs, of the group of UEs, is permitted to use the resource for RACH transmission.

10. The apparatus of claim 9, wherein each UE, of the group of UEs, is associated with a corresponding identification number, and wherein the subset of UEs is based at least in part on the corresponding identification numbers of the subset of UEs.

11. The apparatus of claim 10, wherein each UE, of the subset of UEs, is associated with a corresponding one of an odd identification number or an even identification number.

12. The apparatus of claim 1, wherein the indication is based at least in part on a prioritized downlink communication to the other UE.

13. The apparatus of claim 1, wherein the first message comprises a radio resource control message, a system information block (SIB) message, or a synchronization signal block (SSB) message.

14. The apparatus of claim 1, wherein the first message comprises a physical downlink control channel (PDCCH) order message, wherein the PDCCH order message triggers a RACH procedure corresponding to the RACH message.

15. An apparatus for wireless communication at a base station, comprising:
one or more memories; and
one or more processors, coupled to the one or more memories, configured to:
transmit, to a user equipment (UE), in a first message, a configuration of multiple resources associated with a random access channel (RACH) message;
transmit, to the UE, in a second message comprising a downlink control information (DCI) communication or a physical downlink shared channel (PDSCH) transmission, based at least in part on a crosslink interference (CLI) measurement associated with the UE and another UE, an indication of whether one or more resources, of the multiple resources, associated with the RACH message, are permitted to be used for transmission of the RACH message, wherein the indication is included in a dynamic signaling communication; and
receive, from the UE, the RACH message in accordance with the indication.

16. The apparatus of claim 15, wherein the base station is operating in a full duplex (FD) mode.

17. The apparatus of claim 15, wherein the dynamic signaling communication is a broadcast message.

18. The apparatus of claim 15, wherein the DCI communication is a common DCI communication directed to a group of UEs.

19. The apparatus of claim 15, wherein the base station is operating in a full duplex (FD) mode, and wherein, based at least in part on the CLI measurement satisfying a threshold, the one or more resources are is permitted to overlap with a downlink resource associated with the other UE.

20. The apparatus of claim 15, wherein the base station is operating in a full duplex (FD) mode, and wherein, based at least in part on the CLI measurement not satisfying a threshold, the one or more resources are is not permitted to overlap with a downlink resource associated with the other UE.

21. The apparatus of claim 15, wherein the one or more processors are further configured to transmit a configuration of another resource, of the one or more resources, associated with the RACH message, wherein the indication indicates that the other resource associated with the RACH message is not permitted to be used for transmission of the RACH message based at least in part on the CLI measurement.

22. The apparatus of claim 15, wherein the indication is directed to a group of UEs.

23. The apparatus of claim 15, wherein the indication is based at least in part on a prioritized downlink communication to the other UE.

24. The apparatus of claim 15, wherein the first message comprises a radio resource control message, a system information block (SIB) message, or a synchronization signal block (SSB) message.

25. The apparatus of claim 15, wherein the first message comprises a physical downlink control channel (PDCCH) order message, wherein the PDCCH order message triggers a RACH procedure corresponding to the RACH message.

26. A method of wireless communication performed by a user equipment (UE), comprising:
receiving a configuration, in a first message, of multiple resources associated with a random access channel (RACH) message;
receiving an indication, in a second message comprising a downlink control information (DCI) communication or a physical downlink shared channel (PDSCH) transmission, based at least in part on a crosslink interference (CLI) measurement associated with another UE, of whether one or more resources, of the multiple resources, associated with the RACH message, are permitted to be used for transmission of the RACH message, wherein the indication is included in a dynamic signaling communication; and
transmitting the RACH message in accordance with the indication.

27. The method of claim 26, wherein the indication is received from a base station operating in a full duplex (FD) mode.

28. The method of claim 26, further comprising receiving a configuration of another resource, of the one or more resources, associated with the RACH message, wherein the indication indicates that the other resource associated with the RACH message is not permitted to be used for transmission of the RACH message based at least in part on the CLI measurement.

29. A method of wireless communication performed by a base station, comprising:
transmitting, to a user equipment (UE), in a first message, a configuration of multiple resources associated with a random access channel (RACH) message;
transmitting, to the UE, in a second message comprising a downlink control information (DCI) communication or a physical downlink shared channel (PDSCH) transmission, based at least in part on a crosslink interference (CLI) measurement associated with the UE and another UE, an indication of whether one or more resources, of the multiple resources, associated with the RACH message, are permitted to be used for transmission of the RACH message, wherein the indication is included in a dynamic signaling communication; and receiving, from the UE, the RACH message in accordance with the indication.

30. The method of claim 29, further comprising transmitting a configuration of another resource associated with the RACH message, wherein the indication indicates that the other resource associated with the RACH message is not permitted to be used for transmission of the RACH message based at least in part on the CLI measurement.

* * * * *